UNITED STATES PATENT OFFICE.

JOHN E. BUCHER, OF COVENTRY, RHODE ISLAND.

METHOD OF PRODUCING ALKALI METALS.

1,079,974.     Specification of Letters Patent.     Patented Dec. 2, 1913.

No Drawing.     Application filed July 22, 1912. Serial No. 710,758.

*To all whom it may concern:*

Be it known that I, JOHN E. BUCHER, a citizen of the United States, residing at Coventry, in the county of Kent and State of Rhode Island, have invented certain new and useful Improvements in Methods of Producing Alkali Metals, of which the following is a full, clear, and exact description.

This invention relates to the preparation or derivation of metals, and especially the alkali metals, e. g., sodium and potassium, from their cyanogen compounds or derivatives, or the like, by the action of heat upon their cyanids, ferro-cyanids, ferri-cyanids, etc., in the presence of elements which absorb, dissolve or react with one, at least, of the non-metallic constituents of such a compound at a suitable temperature. Sodium and potassium, for example, were formerly prepared by heating alkali carbonates or hydroxids with carbon, as exemplified by the following equations:

(1). $K_2CO_3 + 2C = 2K + 3CO$ (2). $2KOH + 2C = 2K + 2CO + H_2$

These reactions require an objectionably high temperature and the carbon monoxid thus formed has a strong tendency to combine with the liberated metal, especially to form dangerous explosive compounds, such as $C_6O_6K_6$; while it tends also to reform the carbonate; equation 1 being a reversible one. These disadvantages and the resulting expense and danger led to the practical abandonment of such non-electrolytic methods and the development of the modern electrolytic processes.

In my work on the synthesis of cyanids and on the purification of iron (applications for Letters Patent for processes relating to the latter of which have been filed in the United States Patent Office, being there identified respectively as applications Serial Number 676,399, dated Feb. 8, 1912, and Serial Number 690,886, dated April 15, 1912), I discovered a non-electrolytic method for preparing metals such as sodium or potassium, which avoids the danger and difficulties of the older methods and which yields by-products which are of special value, particularly in connection with my processes for the purification of metals. Reference may here be made to my copending applications relating to the synthesis and production of cyanids and the like; said applications being respectively designated Serial No. 711,211, filed July 24, 1912, entitled "Synthetic production of cyanogen compounds and the like," and Serial No. 726,924, filed October 21, 1912, entitled "Process for fixing atmospheric nitrogen." It is obvious that by operating the herein described process in conjunction or in combination with the economic processes for producing cyanogen compounds which I have invented and to which the said applications will relate, or with any other suitable and commercially inexpensively operated process of cyanid formation, alkali metals may be produced non-electrolytically, cheaply and in abundance. I desire, however, to lay particular emphasis on the value of the present process, in view of the use of alkali metals in my processes for decarburizing steel and the like.

Considering more particularly the present process: I have discovered that while the cyanids of sodium or potassium, for example, can be distilled substantially unchanged in vessels of porcelain or hard glass, when the distillation is conducted in iron tubes, nitrogen is given off steadily and free metal, e. g., sodium or potassium, is deposited on the colder portions of the tube or vessel. Still better results were obtained by heating a mixture of powdered or otherwise finely divided iron and alkali metal cyanid or cyanids; or by distilling the cyanid either by itself (or with a current of gas such as hydrogen, or even nitrogen) through a porous layer of highly heated and, in this case, preferably incandescent iron. Apparently the reaction may be represented as follows:

(3)   $2KCN + iron =$
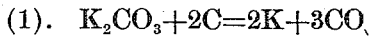
$2K + \text{carbonized iron} + N_2$ (4)   $2NaCN + iron =$
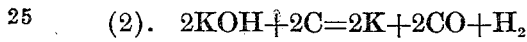
$2Na + \text{carburized iron} + N_2$ (5)   $K_4Fe(CN)_6 + iron =$
                 $4K + \text{carburized iron} + 3N_2$ When the temperature and other conditions are suitable, the alkali metals distil from the reaction mixture in substantially pure form. Incidentally nitrogen, free from argon, is given off. As oxygen-free compounds are used, the method also avoids the serious danger of explosions resulting from the carbon monoxid produced by the older methods. When iron is used, carburized iron is obtained as another by-product. The carbon may be removed from this carburized iron, thus:

(6) Carburized iron$+2K+N_2=$
$$2KCN+\text{iron}$$

(7) Carburized iron$+2Na+N_2=$
$$2NaCN+\text{iron}$$

or by other suitable reactions such as:

(8) Carburized iron$+O_2=$iron$+2CO$

The decarburized iron thus obtained can obviously be used over again, in a cyclic manner, if desired.

Iron, as has been intimated, is not the only reagent adapted for use in the process; other metals or elements, such as aluminium and magnesium being also available in some cases. Whatever be the metal or material used in lieu of iron it should be incapable, as is iron, of directly combining with the alkali metal, but capable of dissociating the non-metallic constituent elements of the radical present in the cyanid or like compound used, by directly and separately combining with one, at least, of these elements and in any event with that one of said elements which might directly combine with the alkali metal base after the cyanogen compound has been broken down. Neither sodium nor potassium can so directly combine with either carbon or nitrogen under the conditions of the operation, but lithium may, as will be hereinafter more fully considered. Since the alkali metal base of the cyanogen compound is incapable, under the imposed conditions, of directly and separately uniting with either of said non-metallic elements, said base is liberated in free or molecular condition. The contact between the radical-dissociating reagent and the cyanogen compound should preferably be as intimate as possible, and it is for this reason that I prefer to use said reagent in finely divided condition when the temperature of the operation is such that the reagent is in non-fluid or solid form. If the reagent used is a metal or element which forms a nitrid as well as a carbid under the conditions of the process, then a mixture of nitrid and carbid may be formed. For example:

(9) $3KCN+7Al=Al_4C_3+3AlN+3K$ or, nitrid alone might form,

(10) $KCN+Al=AlN+C+K.$

The alkali metal from the cyanid in these latter cases may be separated, as before, from the non-volatile carbids and nitrids. The nitrids may then be used in various ways, e. g., to form ammonia and aluminium compounds (if aluminium be the dissociating material or reagent employed), or even to reform the aluminium itself, thus making the action of the aluminium cyclic. The fact that the alkali metal sought has in each case a lower temperature of volatilization than the remaining products of the reactions in question is of considerable importance since distillation from the already heated reaction products affords a simple and inexpensive means for obtaining such metal in a substantially pure condition; no subsequent refining process being necessary. Equations 3 and 6, for example, may be written thus:

(11) $2KCN+\text{iron} \leftrightarrows$
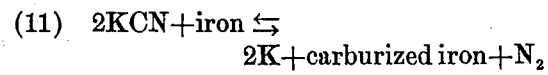
$$2K+\text{carburized iron}+N_2$$

the reaction involved being a reversible one and depending upon the relative active masses of the respective reacting materials or elements present; or in other words upon what is known as "the law of mass action." Thus, if metallic sodium, carbon and pulverulent iron (or carbid of iron) be heated to dull redness, while intimately commingled, and while passing a current of atmospheric nitrogen thereover or through, the reaction is exothermic and results in the formation of sodium cyanid; while, on the other hand, if sodium cyanid and finely divided iron be heated, preferably, although not necessarily, to a somewhat higher temperature, the reaction is endothermic and yields metallic sodium in the manner hereinbefore described.

I am aware that various materials may be substituted for those particularly specified and that other changes may be made in the manner of effectuating my process without departing from the spirit of my invention and I hence desire to be limited only by the claims appended hereto. It may be stated, however, that owing to the peculiar efficiency of iron in the process and in view of the relatively non-volatile by-products resulting from the use of this substance therein, I regard it as the preferred reagent and have hence particularly referred to it in certain of the more limited claims. A plurality of dissociating reagents may be used in certain cases, as, for example, iron and aluminium. Wherever, however, distillation is to be resorted to as the means for separating the freed alkali metal from the products of the reaction, it is obvious that both the dissociated reagent and the alkali metal compound used should be so selected that said products of reaction other than the liberated alkali metal shall have boiling points higher than that of the alkali metal.

The temperature of the operation should be above 500° C., or in other words, little, if any, below a dull red heat but may range from thence upward to 1200° C., or higher. Where the iron is used in solid form, it is preferable to operate at temperatures below this last mentioned figure on account of the cost of fuel or energy and up-keep of the apparatus.

Since, as intimated in the opening paragraph of this specification, the carbon, for example, of the alkali metal compound may be absorbed by, dissolved in, or reacted with the dissociating reagent, e. g., iron, the word "combine" or its derivatives, has been used in certain of the appended claims, for want of a better generic term, to cover this and like actions; said word being of sufficient breadth to include both chemical combination or union, and physico-chemical combination such as occurs in absorption, adsorption and solution.

In conclusion I desire to emphasize the fact that while sodium and potassium may be produced in the manner indicated at temperatures preferably approximating a bright red heat, the alkali metal lithium, owing to the fact that it may be readily combined directly with nitrogen, cannot in all cases be obtained as a free metal at such a temperature; while the action of heat alone may cause the cyanid thereof to break down as shown by the equation:

(12) 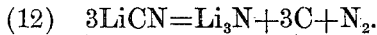  $3LiCN = Li_3N + 3C + N_2$.

At a very high temperature, metallic lithium might be obtained from its nitrid.

Where aluminium or some like nitrid forming element or elements is used to break down the cyanid, I am of the opinion that it is possible that free metals such as lithium and calcium may be obtained because of the great affinity of aluminium for nitrogen. For example:

(13)   $Li_3N + Al = AlN + 3Li$.

In like manner:

(14)   $LiCN + Al = AlN + Li + C$

Sodium and potassium are, however, I consider, the most commercially valuable metals which may be obtained by my process and I have hence directed the more specific claims particularly thereto.

I have termed such alkali metals as sodium and potassium, which will not directly unite with the liberated nitrogen under the imposed conditions, non-nitrid forming metals.

By the term "cyanogen compound" I contemplate any compound which includes the radical CN as a constituent thereof.

Having described my invention, I claim:—

1. The process of producing alkali metals which comprises reacting on a cyanogen compound of the alkali metal sought, with an element incapable of directly chemically combining with said metal but capable of dissociating the element carbon from the element nitrogen of said compound by directly combining with one of said elements, and thereby liberating said alkali metal.

2. The process of producing alkali metals which comprises reacting on a cyanogen compound of the alkali metal sought, with a reagent incapable of directly chemically combining with said metal but capable of dissociating the carbon from the nitrogen of said compound by directly combining with said carbon, and thereby liberating said alkali metal.

3. The process of producing alkali metals which comprises reacting on a cyanogen compound of the alkali metal sought, with iron to form carburized iron and to thereby liberate said alkali metal.

4. The process of producing alkali metals which comprises bringing a cyanogen compound of the alkali metal sought into intimate contact with finely divided iron and effecting a chemical reaction therebetween at an elevated temperature, whereby to form iron carbid and to liberate nitrogen and the alkali metal.

5. The process of producing alkali metals which comprises bringing the cyanid of the alkali metal sought into intimate contact with a finely divided metal capable of separately combining with one of the two non-metallic constituent elements of said cyanid and effecting a reaction between said cyanid and said finely divided metal at an elevated temperature, whereby to liberate both said alkali metal and the other of said non-metallic elements.

6. The process of producing alkali metals which comprises bringing the cyanid of the alkali metal sought into intimate contact with finely divided iron and effecting a reaction therebetween through the instrumentality of heat, whereby to liberate both said alkali metal and nitrogen.

7. The cyclic process of producing alkali metals which comprises reacting on a cyanogen compound of the alkali metal sought, with a metallic reagent capable of dissociating said compound by directly combining separately with one of the non-metallic constituent elements thereof, and thereby liberating said alkali metal and another of said elements, thereafter separating said metallic reagent from the non-metallic element so combined therewith, and repeating the cycle.

8. The process of producing alkali metals which comprises effecting an endothermic reaction at an elevated temperature, between a compound of said alkali metal which includes a radical one of the two constituents of which is nitrogen, and a substance incapable of directly combining with nitrogen but capable of uniting with the other constituent of said radical, whereby to liberate both said alkali metal and nitrogen.

9. The process of producing alkali metals which comprises effecting an endothermic reaction, at an elevated temperature, between a compound of said alkali metal which includes a radical one of the two constituents of which is nitrogen, and a substance capable of separately combining with one of the constituent elements of said radical, whereby to liberate said alkali metal.

10. The process of producing alkali metals which comprises effecting an endothermic reaction, at an elevated temperature between a compound of said alkali metal which includes a radical one of the two constituents of which is nitrogen, and a substance capable of separately combining with one of the constituent elements of said radical, whereby to liberate said alkali metal, and separating said alkali metal from the products of said reaction by distillation.

11. The process of producing alkali metals which comprises effecting an endothermic reaction at a temperature above 500° C. between a compound of said alkali metal which includes a radical one of the two constituents of which is nitrogen, and a substance capable of separately combining with one of the constituent elements of said radical, whereby to liberate said alkali metal.

12. The process of producing alkali metals which comprises effecting an endothermic reaction, at a temperature below 1200° C., between a compound of said alkali metal which includes a radical one of the two constituents of which is nitrogen, and a substance capable of separately combining with one of the constituent elements of said radical, whereby to liberate said alkali metal.

13. The process of producing alkali metals which comprises effecting an endothermic reaction at a temperature materially below a white heat between a compound of said alkali metal which includes a radical having two constituent elements one at least of which is incapable of directly and separately uniting with said alkali metal, and material capable of separately combining with the other of said constituent elements of said radical, whereby to dissociate said radical and liberate the alkali metal.

14. The process of producing alkali metals which comprises effecting an endothermic reaction between a compound of said alkali metal which includes a radical having two constituent elements both of which are incapable of directly and separately uniting with said alkali metal, and material capable of separately combining with one of said constituent elements of the radical, whereby to dissociate said radical and liberate the alkali metal.

15. The method of producing a substantially pure alkali metal which comprises reacting endothermically upon an oxygen free compound of the alkali metal sought and which compound includes a radical, with a material capable of separately combining with one of the constituent elements of said radical, whereby to dissociate the latter and liberate alkali metal, and separating said alkali metal from the products of said reaction by distillation, said compound and said material being such that one of said products has a boiling point materially below that of the alkali metal and the said products of the reaction other than said one and the free alkali metal have boiling points higher than that of said alkali metal.

16. The process of producing the alkali metals sodium and potassium which comprises reacting on a cyanogen compound of the alkali metal sought, with an element incapable of directly chemically combining with said metal but capable of dissociating the element carbon from the element nitrogen of said compound by directly combining with one of said element to thereby liberate said alkali metal.

17. The process of producing the alkali metals sodium and potassium which comprises reacting on a cyanogen compound of the alkali metal sought, with a reagent incapable of directly chemically combining with said metal but capable of dissociating the carbon from the nitrogen of said compound by directly combining with said carbon, and thereby liberating said alkali metal.

18. The process of producing alkali metals which comprises bringing the cyanid of the alkali metal sought into intimate contact with a finely divided metal capable of separately combining with one of the two non-metallic constituent element of said cyanid and effecting a reaction between said cyanid and said finely divided metal at an elevated temperature, whereby to liberate both said alkali metal and the other of said non-metallic elements, neither of said non-metallic elements being able to directly and separately combine with the liberated alkali metal, under the conditions of the operation, substantially as described.

19. The process of producing alkali metals which comprises bringing a cyanogen compound of the alkali metal sought into intimate contact with an element capable of separately combining with one of the non-metallic constituent elements of said compound and effecting a reaction between said compound and said first mentioned element at an elevated temperature, whereby to liberate both said alkali metal, and another of said non-metallic elements, neither of said non-metallic constituent elements of said compound being able to directly and separately combine with the liberated alkali metal under the conditions of the operation, substantially as described.

In witness whereof, I subscribe my signature, in the presence of two witnesses.

JOHN E. BUCHER.

Witnesses:
 WALDO M. CHAPIN,
 IDA M. PATTERSON.